Nov. 4, 1969  TING HOK-SHOU  3,476,389
MECHANICAL LAP COUNTER FOR SLOT GUIDED TOY VEHICLES
Filed June 2, 1965  2 Sheets-Sheet 2
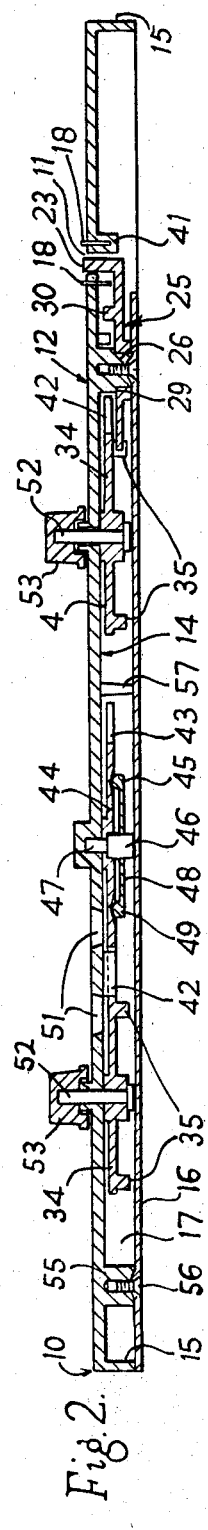
TING HOK-SHOU,
INVENTOR
BY Wenderoth,
Findland Ponack, ATTORNEY United States Patent Office 3,476,389
Patented Nov. 4, 1969

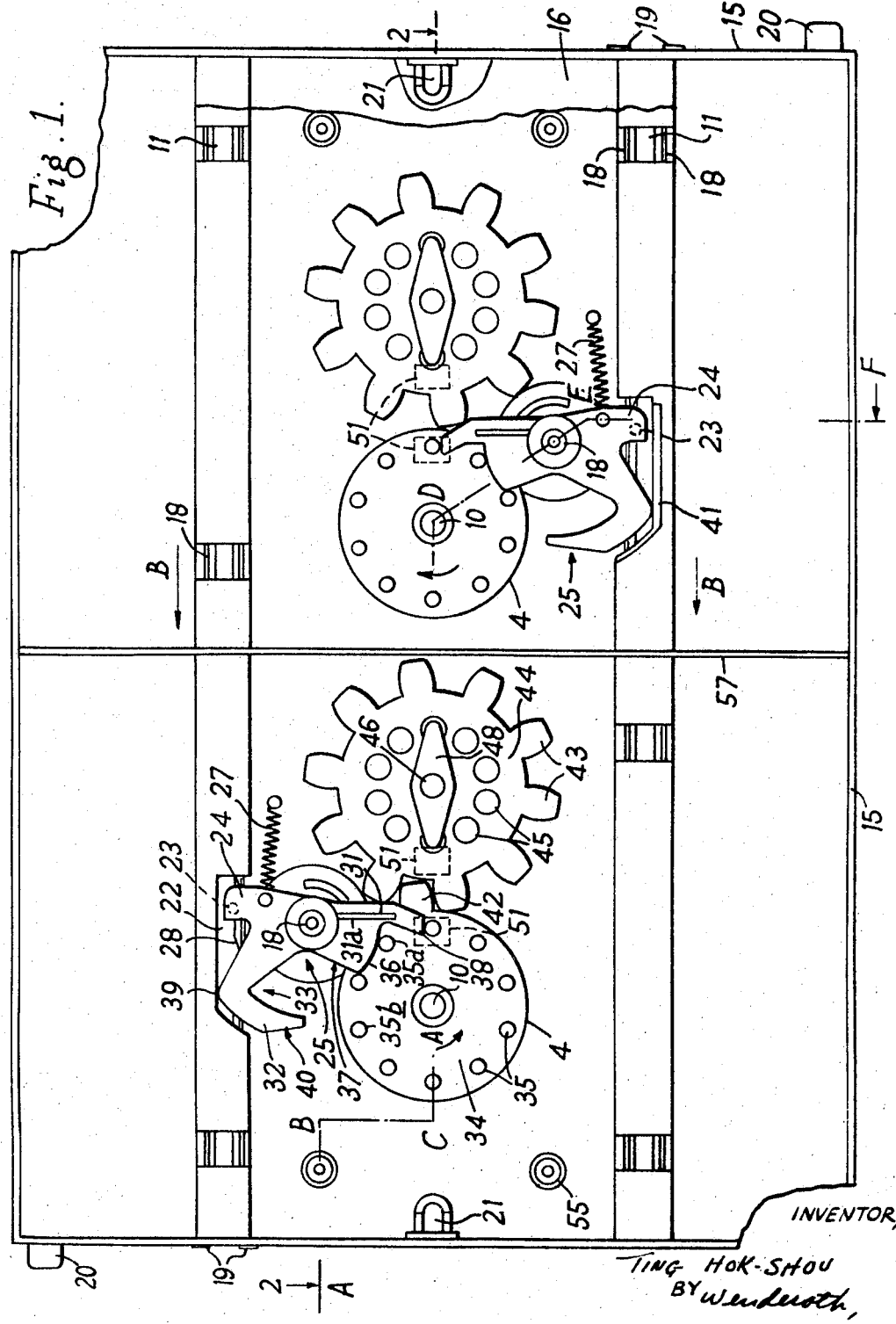

3,476,389
MECHANICAL LAP COUNTER FOR SLOT GUIDED TOY VEHICLES
Ting Hok-Shou, North Point, Hong Kong, assignor to Kader Industrial Company Limited, North Point, Hong Kong, a corporation of Hong Kong
Filed June 2, 1965, Ser. No. 460,662
Claims priority, application Great Britain, July 6, 1964, 27,824/64
Int. Cl. A63f 9/14
U.S. Cl. 273—86        4 Claims

ABSTRACT OF THE DISCLOSURE

A section of track for use in electric slot car racing having counting means and actuating means for the said counting means, which actuating means comprises an actuating member provided at a location in each groove and adapted to be engaged and moved by the projection on a toy vehicle when the latter passes the said location so that the counting means may be operated to give an indication of the number of times a toy vehicle passes the said location.

---

This invention relates to tracks for use with electrically propelled toy vehicles.

The invention is concerned with track of the kind which is made in sections having therein one or more (usually two) grooves. Such a track (which is hereinafter referred to as a "track of the kind set forth") is normally used with a toy vehicle of the kind (hereinafter referred to as a "toy vehicle of the kind set forth") having a projection which engages in the groove whereby the toy vehicle may be guided along a path determined by the groove.

According to one aspect of the invention there is provided a section of track of the kind set forth having counting means and actuating means for the said counting means, which actuating means comprises an actuating member provided at a location in the or each groove and adapted to be engaged and moved by the projection on a toy vehicle of the kind set forth when the latter passes the said location so that the counting means may be operated to give an indication of the number of times a toy vehicle passes the said location.

The said actuating member is preferably mounted on one arm of a lever device which engages actuating teeth on a disc to rotate the latter. This disc conveniently carries characters which are visible, preferably through windows in the track section, to comprise the counting means. The disc may be arranged to rotate a second disc means so that the capacity of the counting means may be increased, for example the disc may carry numbers which represent units and the disc means may carry numbers which represent tens of units. The disc may be provided with a single drive tooth which engages one of a plurality, usually ten, teeth on the disc means to rotate the latter through a small angle after the disc has rotated through 360°.

The actuating teeth may be in the form of pegs projecting from the disc. The lever device preferably has two arms to engage the actuating teeth so as to impart partial movement to the disc when the actuating member is moved by the toy vehicle as aforesaid and to complete said movement when the actuating member is returned, preferably by spring means.

According to another aspect of the invention there is provided a track of the kind set forth including at least one track section as mentioned above.

An embodiment of the invention will now be described by way of example with reference to the accompanying drawings, in which:

FIGURE 1 is a bottom plan view of a track section of the invention, with the cover part removed for clarity, and FIGURE 2 is a section along the section line A, B, C, D, E, F.

Referring now to the drawings, a moulded plastic track section 10 of the invention has two parallel grooves 11 in its upper or running surface 12. On the under side 14 of the track section 10 are a number of side and end walls 15 for supporting the track section. A cover plate 16 runs between these walls 15 to define therewith a cavity 17 which contains mechanisms to be described. On each side of each groove 11 is a pair of contact rails 18 for supplying power to an electrically propelled toy vehicle of the kind set forth having appropriate contact arms. The track section is also provided with contact members 19, locating lugs 20 and locking openings 21.

Openings 22 which are formed in the underside of the two grooves 11 lead to the cavity 17. An actuating member in the form of a pin 23 projects into each groove 11. This pin 23 is carried on one arm 24 of a three armed lever 25 which is pivoted centrally on a boss 26 (best shown in FIGURE 2) and biassed by a spring 27. The edge 28 of the opening 22 is curved to accommodate the arcuate movement of the pin 23. The lever 25 is spaced away from the under-surface 14 of the track section by being mounted on a shoulder 29 on the boss 26 and by a lug 30 on its underside.

The lever 25 has two further arms 31 and 32 separated by a deep bight 33. This lever 25 cooperates with a first disc 34 rotatable about an axis spaced from boss 26 and having ten equispaced pegs 35 projecting from its underside. The arms 31 and 32 engage these pegs 35 to rotate the disc 34 when the lever 25 rocks. The arm 31 which has a strengthening ridge 31a therealong has an arcuate end surface 36 leading from a substantially radial face 37 and to a projecting nose 38. When the lever 25 is in a position of rest (as shown) the surface 36 and nose 38 serve to locate one peg 35a and thus to define the position of the disc 34. The other arm 32 of lever 25 is hook shaped. The arm 32 has a surace 39 at the base of the hook to engage the side of groove 11 or a raised shoulder 41 running therealong to locate the lever 25 in the position of rest. The arm 32 also has an outside surface 40 near its end which, when the lever 25 is rocked, will engage a peg 35b which is next to the peg adjacent peg 35a to rotate the disc 34 in the direction of arrow A through an angle which is approximately half the angular distance between two pegs 35. The surface 36 of arm 31, which is rocked clear of pin 35a before surface 39 engages the peg 35b, is so arranged that, when the lever 25 is returned by spring 27, it (the surface 36) will butt against the peg 35a, which has been moved as aforesaid, to move the peg 35a and hence the disc 34 through the remainder of the angular distance between two pegs 35.

The disc 34 carries a single tooth 42 which meshes with the ten teeth 43 on a second disc 44. This disc 44 has ten equispaced circular depressions 45 on its under surface. This disc 44 is rotatable about a pin 46 which has a square peg piece 47 engaging in track section 10 and which carries a double arm spring 48 at its end. The spring 48 has projections 49 at its ends to engage the depressions 45 to hold the disc 44 in preset positions.

The discs 34 and 44 carry the digits 0–9 on their upper surfaces. These digits may be seen through a pair of windows 51 above the discs. The digits are visible when the discs 34 and 44 are in the positions set respectively by the arm 31 and the projections 49 as aforedescribed.

In use, the track section 10 is connected to a number of other sections to form a complete track. Electrically propelled toy vehicles of the kind set forth, usually in the shape of racing motor cars, are caused to circle the track in the direction of arrows B. Each time such a vehicle passes the opening 22, the projection on the vehicle passes the opening 22, the projection on the vehicle engages the pin 23 causing the lever 25 to rock as described above. This in turn causes the disc 34 to rotate so that a subsequent number appears at the windows 51. The counting mechanism may thus count up to ninety-nine passes of the vehicle.

Each disc 34 is carried for rotation on a spindle 52 which projects beyond the upper surface 12 of the track section 10 and there carries a knurled knob 53. By means of this knob 53, the disc 34 can be rotated in a direction opposite to that indicated by arrow A for example to reset the zero figures at the windows 51. Rotation of the disc 34 in the direction of arrow A by the knob 53 is prevented because the nose 38 of arm 31 is in the path of movement of a peg 35c.

The track section 10 also has on its underside 14 bosses 55 into which cover securing screws 56 engage and also a transverse ridge 57 which divides the cavity 17 into two compartments as well as serving to strengthen the section.

The discs 34 together with the pegs 35 and teeth 42, the discs 44 and the levers 25 are preferably each made as one piece mouldings.

What I claim is:

1. A section of track having two parallel grooves therein, for engagement by a projection on a toy vehicle to be used with the track, the track section comprising for each groove a pivotally mounted lever device having first, second and third arms, an actuating member on the first arm projecting into the associated groove at a specified location to be engaged and moved by the said projection on a toy vehicle when the latter passes the said location thereby pivoting the said lever device, spring means to return the lever device when pivoted as aforesaid, a disc having characters on one side thereof for indicating the number of times a toy vehicle passes the said location, individual projections on the other side of the disc, the projections being so located that one projection lies in the path of the second arm whereby on pivotal movement of the lever device the disc will be moved through a small angle to lie in an intermediate position in which a projection lies in the path of the third arm so that on the return of the lever device by the spring means the disc will be moved through a further small angle.

2. A section of track as claimed in claim 1, wherein the projections comprise pegs projecting from the disc.

3. A section of track as claimed in claim 1, wherein one of the said second and third arms acts as a stop to prevent the disc moving in a direction opposite to that in which it is moved by the lever device.

4. A section of track as claimed in claim 1, wherein there is included a second character bearing disc, driven by the first recited disc and the second disc has a plurality of depressions arranged in a circle therearound and spring urged detents resiliently engage in at least one of the depressions to retain the disc at a number of predetermined locations.

References Cited

UNITED STATES PATENTS

| 213,492 | 3/1879 | Benton | 235—113 |
| 2,548,495 | 4/1951 | Robins | 273—86.2 |
| 2,631,853 | 3/1953 | Haynes et al. | 273—86.2 |
| 3,228,600 | 1/1966 | May | 273—86 X |

FOREIGN PATENTS

| 935,244 | 2/1948 | France. |
| 1,356,440 | 2/1964 | France. |
| 907,252 | 10/1962 | Great Britain. |

ANTON O. OECHSLE, Primary Examiner

M. R. PAGE, Assistant Examiner

U.S. Cl. X.R.

235—98